United States Patent
Morris

(10) Patent No.: US 8,534,612 B2
(45) Date of Patent: Sep. 17, 2013

(54) TRAILING EDGE FLAP

(75) Inventor: Stuart Morris, Bristol (GB)

(73) Assignee: Airbus Operations Limited, Bristol (GB)

( * ) Notice: Subject to any disclaimer, the term of this patent is extended or adjusted under 35 U.S.C. 154(b) by 159 days.

(21) Appl. No.: 12/939,203

(22) Filed: Nov. 4, 2010

(65) Prior Publication Data

US 2011/0127385 A1 Jun. 2, 2011

(30) Foreign Application Priority Data

Nov. 27, 2009 (GB) .................................. 0920969.3

(51) Int. Cl.
*B64C 9/14* (2006.01)

(52) U.S. Cl.
USPC ............ 244/217; 244/211; 244/212; 244/215

(58) Field of Classification Search
USPC .......................................... 244/211–217, 219
See application file for complete search history.

(56) References Cited

U.S. PATENT DOCUMENTS

| | | | | |
|---|---|---|---|---|
| 2,137,879 A | * | 11/1938 | Ksoll ............................. | 244/216 |
| 2,146,014 A | * | 2/1939 | Grant ............................. | 244/216 |
| 2,222,187 A | * | 11/1940 | Weatherbee .................... | 244/216 |
| 2,254,304 A | * | 9/1941 | Miller ........................... | 244/216 |
| 2,591,000 A | * | 4/1952 | O'Brien ......................... | 244/216 |
| 3,721,406 A | * | 3/1973 | Hurlbert ........................ | 244/216 |
| 3,977,630 A | * | 8/1976 | Lewis et al. .................... | 244/216 |
| 4,049,219 A | * | 9/1977 | Dean et al. ..................... | 244/217 |
| 4,702,442 A | * | 10/1987 | Weiland et al. ................ | 244/216 |
| 4,796,840 A | * | 1/1989 | Heynatz ........................ | 244/215 |
| 5,098,043 A | * | 3/1992 | Arena ........................... | 244/215 |
| 6,123,297 A | * | 9/2000 | Berry ............................ | 244/214 |
| 7,367,532 B2 | * | 5/2008 | Libby ............................ | 244/216 |
| 7,520,471 B2 | * | 4/2009 | Reckzeh et al. ............... | 244/215 |
| 7,600,718 B2 | * | 10/2009 | Perez-Sanchez .............. | 244/215 |
| 7,661,630 B2 | * | 2/2010 | Libby ............................ | 244/216 |
| 7,891,611 B2 | * | 2/2011 | Huynh et al. ................. | 244/215 |
| 2005/0230565 A1 | * | 10/2005 | Kallinen ........................ | 244/217 |
| 2009/0108142 A1 | * | 4/2009 | Wright et al. ................. | 244/215 |
| 2010/0059633 A1 | * | 3/2010 | Pohl ............................. | 244/215 |
| 2010/0286849 A1 | * | 11/2010 | Huynh et al. ................. | 244/215 |
| 2010/0308162 A1 | * | 12/2010 | Gartelmann ................. | 244/99.3 |

FOREIGN PATENT DOCUMENTS

WO 2009065597 A1 5/2009

OTHER PUBLICATIONS

UK Search Report for Application No. GB0920969.3 mailed Mar. 8, 2010.

* cited by examiner

*Primary Examiner* — Tien Dinh
*Assistant Examiner* — Steven Hawk
(74) *Attorney, Agent, or Firm* — Lowe Hauptman & Ham, LLP

(57) ABSTRACT

A trailing edge flap arrangement for an aircraft wing, comprising an array of flap elements moveable collectively between a retracted and an extended position, wherein at least the leading flap element is rotatable about its axis independently of the collective array movement. Also, a method of operating the trailing edge flap arrangement, comprising collectively moving the array of flap elements between a retracted and an extended position, and rotating at least the leading flap element about its axis independently of the collective array movement. The flap arrangement can be deployed as a single slotted flap which can be vented to further improve lift performance. The flap arrangement can also be operated to provide variable camber across the performance envelope.

15 Claims, 2 Drawing Sheets

TRAILING EDGE FLAP

RELATED APPLICATIONS

The present application is based on, and claims priority from, Great Britain Application Number 0920969.3, filed Nov. 27, 2009, the disclosure of which is hereby incorporated by reference herein in its entirety.

FIELD OF THE INVENTION

The present invention relates to a trailing edge flap arrangement for an aircraft wing. The invention also relates to a method of operating a trailing edge flap arrangement.

BACKGROUND OF THE INVENTION

Aircraft wing trailing edge flaps are high lift devices which are typically deployed on take-off and landing to increase the lift coefficient by increasing the camber of the wing aerofoil. This can be achieved by rotating the flap downwardly about its hinge line with respect to the fixed wing portion. Some flaps, for example the Fowler flap, further increase the lift generated by the wing by also increasing the planform area of the wing. This is achieved by moving the flap along a track such that the flap moves aft and rotates downwardly when deployed. A "drop hinge flap" is a further type of flap having a hinge point typically below the fixed wing trailing edge, such that the flap moves aft and down with respect to the fixed wing as it rotates downwardly about its hinge point.

A single slotted flap arrangement is generally preferred as this provides a simple, lightweight solution. These are beneficial for take-off but suffer performance losses at the higher deflections required for landing. Within an aircraft family, these performance losses can be acceptable on lightweight variants but higher weight variants may demand double or triple slotted flap arrangements to generate the necessary lift. Many multi-slotted flap arrangements are known but drop hinge flap arrangements conventionally provide only a single slot due to their single hinge point. Accordingly, it can be necessary for aircraft manufacturers to adopt a completely different flap arrangement for use on higher weight aircraft variants within a family, which is undesirable.

SUMMARY OF THE INVENTION

A first aspect of the invention provides a trailing edge flap arrangement for an aircraft wing, comprising an array of flap elements moveable collectively between a retracted and an extended position, wherein at least the leading flap element is rotatable about its axis independently of the collective array movement.

A further aspect of the invention provides a method of operating a trailing edge flap arrangement on an aircraft wing, the flap arrangement including an array of flap elements, wherein at least the leading flap element is rotatable about its axis, the method comprising: collectively moving the array of flap elements between a retracted and an extended position; and rotating at least the leading flap element about its axis independently of the collective array movement.

The invention is advantageous in that when the flap elements move collectively they can be deployed sealed together like a standard single slotted flap to open up a single through slot between the fixed wing portion and the flap. This brings the benefits associated with standard single slotted flap arrangements. However, rotating at least the leading flap element about its axis makes it possible to vent the flap independently of the flap deployment angle. Venting the flap significantly improves the lifting potential of the arrangement without much of the complexity typically associated with multi-slotted flap arrangements. Where the trailing flap element is rotatable it also becomes possible to provide variable camber benefits across the entire performance envelope.

The flap arrangement may be used with either a kinematic track or linkage arrangement. The flap elements may be supported by the track, or by the linkage arrangement, from the aircraft wing for movement relative to the wing. In one embodiment, the linkage arrangement includes a drop link as part of a drop hinge mechanism. An actuator can be used to move collectively the array of flap elements relative to the wing. The array of flap elements may be supported by a common strut.

The or each rotatable flap element may be coupled to a respective actuator for rotating the flap element about its axis. Preferably, the actuator is a linear actuator. For simplicity, the actuator may be adapted to discretely move the flap element between sealed and vented positions. Alternatively, the actuator may be adapted to infinitely vary the position of the flap element between its sealed and vented positions.

The method may further comprise: adjusting the flap arrangement to a first configuration in which the array of flap elements are sealed together and in a retracted position; adjusting the flap arrangement to a second configuration in which the array of flap elements are sealed together and in an extended position so as to open up a slot between the wing and the leading flap element; and adjusting the flap arrangement to a third configuration in which the array of flap elements are in an extended position so as to open up a slot between the wing and the leading flap element, and at least the leading flap element is rotated about its axis so as to open up a slot between the element and its adjacent element.

The flap arrangement is preferably in the first configuration during cruise, in the second configuration during take off, and in the third configuration during landing or heavy take off. The array of flap elements may be partially extended when the flap arrangement is in the second configuration, and fully extended when the flap arrangement is in the third configuration. Where each of the flap elements is rotatable, the angle of incidence of the vented flap elements preferably increases from the leading to the trailing element in the array.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
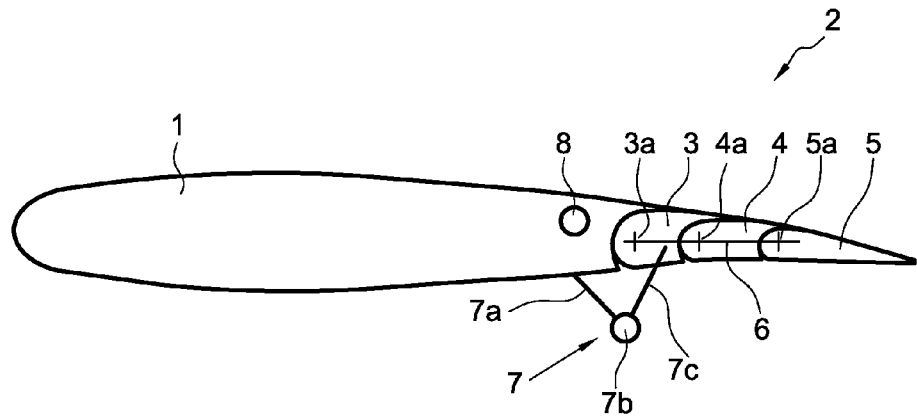
FIG. 1 illustrates a cross section through an aircraft wing having a trailing edge flap arrangement shown in its retracted configuration.

FIG. 1 shows an aircraft wing including a main fixed wing portion 1 and a trailing edge flap arrangement 2. The flap arrangement 2 includes an array of flap elements comprising a leading flap element 3, an intermediate flap element 4 and a trailing flap element 5.

The array of flap elements 3, 4, 5 are supported by a common strut 6 which in turn is pivotally supported from the fixed wing portion 1 by a drop hinge linkage arrangement 7. The drop hinge linkage arrangement includes a fixed strut 7a, a hinge point 7b and a drop link 7c. The fixed strut 7a is mounted to the fixed wing portion 1 and carries the hinge point 7b. The drop link 7c connects the common strut 6 to the hinge point 7b.

Each of the flap elements 3, 4, 5 is individually pivotally supported by the common strut 6 about a respective hinge point 3a, 4a, 5a. The hinge points 3a, 4a, 5a are disposed towards the leading edge of each of the flap elements 3, 4, 5 in the flap arrangement 2. The flap elements 3, 4, 5 are rotatable with respect to the common strut 6 so as to vary the angle of incidence of each of the flap elements 3, 4, 5.

FIG. 1 shows the flap arrangement 2 in its retracted position. The array of flap elements 3, 4, 5 are sealed together and the leading flap element 3 is stowed, tucked against the trailing edge of the fixed wing portion 1. When sealed together, the array of flap elements 3, 4, 5 together form a single flap aerofoil profile.

Figure 2:
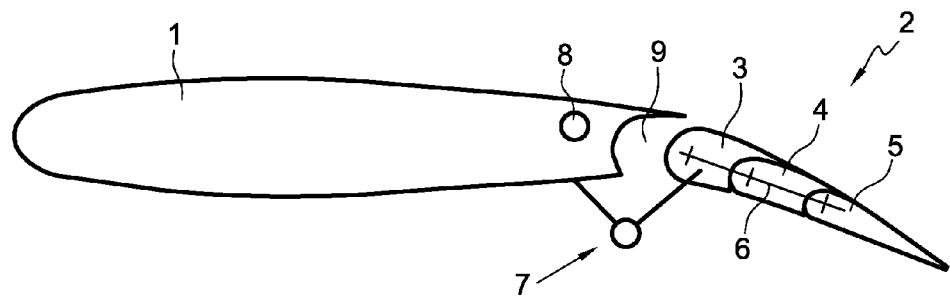
FIG. 2 illustrates the aircraft wing with the flap in its extended, sealed configuration.

FIG. 2 illustrates the flap arrangement 2 in its partially extended position. The array of flap elements 3, 4, 5 remain sealed together as a single flap profile which is deployed by rotating it downwardly using the drop hinge mechanism 7. Movement of the flap arrangements 2 is effected by rotary actuator 8, which is connected by a linkage arrangement (not shown) to the common strut 6. In this partially extended configuration, the flap arrangement 2 functions substantially identically to a standard drop hinge flap arrangement. With the array of sealed flap elements 3, 4, 5 extended by rotation about the drop hinge mechanism 7, a slot 9 is opened up between the fixed wing portion 1 and the leading flap element 3. The single slotted flap configuration shown in FIG. 2 enables high pressure air from the lower wing surface to pass through the slot 9 to energise the boundary layer over the upper surface of the array of flap elements 3, 4, 5 so as to postpone stall in a conventional manner.

Figure 3:
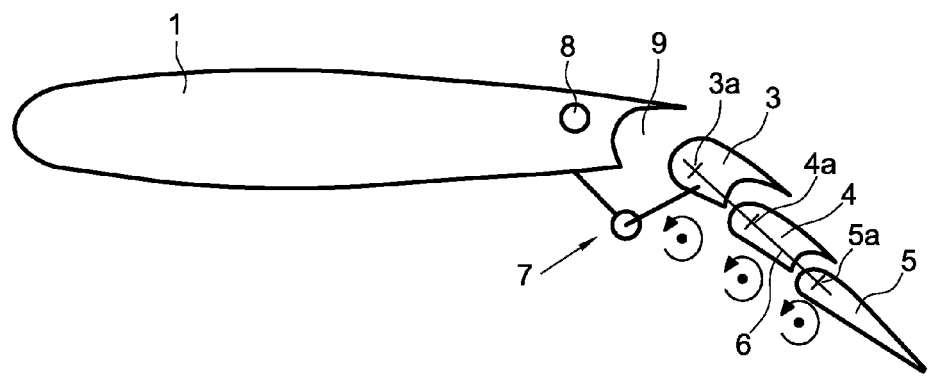
FIG. 3 illustrates the aircraft wing with the flap in its extended, vented configuration.

Turning now to FIG. 3, the flap arrangement 2 is shown in its fully extended position. The common strut 6 supporting the array of flap elements 3, 4, 5 has been rotated a little farther downwardly about the drop hinge mechanism 7 by the actuator 8, and each of the flap elements 3, 4, 5 in the array has now been rotated about its respective hinge point 3a, 4a, 5a with respect to the common strut 6.

Each of the flap elements 3, 4, 5 is rotatable about its respective pivot axis independently of the collective array movement about the drop hinge mechanism 7. Although in FIG. 3 each of the flap elements 3, 4, 5 are shown rotated about their respective axes, only one or some of the flap elements may be rotated. Pivotal movement of each flap element 3, 4, 5 with respect to the common strut 6 is effected by a respective linear actuator 3b, 4b, 5b. These linear actuators 3b, 4b, 5b are operable independently of one another and independent of the position of the common strut 6. In other words, pivoting of each of the flap elements 3, 4, 5 about their respective hinges is made independent of the collective movement of the array of flap elements.

Each of the linear actuators 3b, 4b, 5b is operable to control movement of its respective flap element 3, 4, 5 between a first position, in which the flap element is sealed to its adjacent element, and a second position, in which a slot is opened up between the flap element and its adjacent element. As can be seen from FIG. 4, when the flap elements 3, 4, 5 are moved to a vented position a first slot 10 is opened up between the leading flap element 3 and the intermediate flap element 4, and a second slot 11 is opened up between the intermediate flap element 4 and the trailing flap element 5. These slots 10 and 11, together with the slot 9, create, in effect, a triple slotted flap arrangement.

As is well known, a triple slotted flap is generally more effective at energizing the boundary layer over the upper surface of the flap arrangement and hence the flap arrangement as a whole can be deployed at a greater angle of incidence to the free stream flow over the wing without stalling, hence improving the lift performance of the wing.

Figure 4:
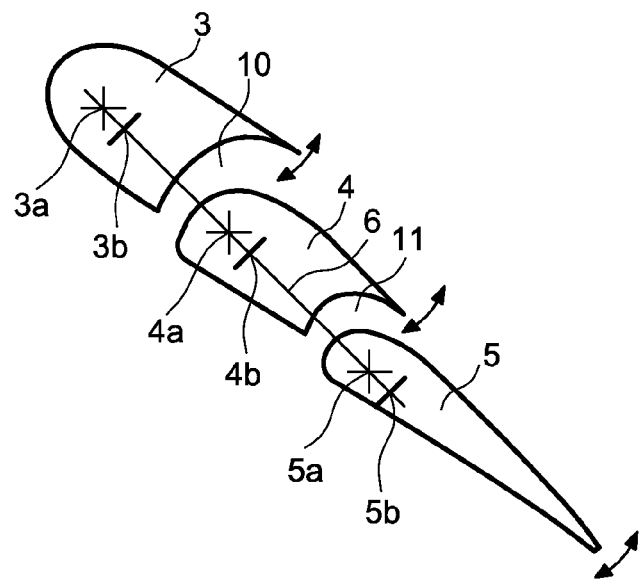
FIG. 4 illustrates schematically the actuators for rotating each flap element about its axis.

As can also be seen from FIG. 4, the angle of incidence of the flap elements 3, 4, 5 increases from the leading element 3 to the trailing element 5 in the array. This is achieved by rotating the lead element 3 anticlockwise (as seen in FIG. 4) from its sealed position through a greater angle than is the case for the trailing element 5. The progressive increase in incidence towards the trailing element 5 in the array ensures that the flow over the upper surface of the flap arrangement 2 remains substantially attached, even at the highest angles of incidence of full flap deployment.

The flap arrangement 2 is particularly beneficial as it is possible to operate the flap element 3, 4, 5 sealed together as a single slotted flap in the configuration shown in FIG. 2, and then with a relatively simple action vent the flap arrangement 2 to form a triple slotted flap for the fully deployed configuration shown in FIG. 3. The configuration shown in FIG. 1 with a flap arrangement in its retracted position is for use during cruise. The configuration depicted in FIG. 2 with the flap elements 3, 4, 5 sealed and collectively deployed as a single slotted flap may be used for take off. The configuration depicted in FIG. 3 with the flap arrangement 2 vented so as to form a triple slotted flap may be used for landing or heavy take off.

Figure 5:
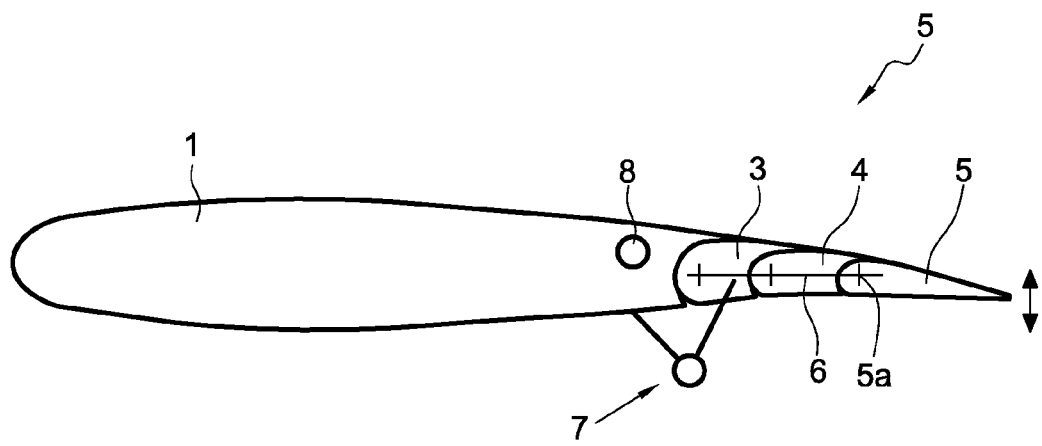
FIG. 5 illustrates the aircraft wing with the flap in its retracted position and the trailing flap element rotated to achieve variable wing camber.

FIG. 5 illustrates a further benefit of the flap arrangement 2 in accordance with this invention. In the cruise configuration the trailing flap element 5 in the array can be rotated to a limited extent about its pivot axis 5a so as to vary the camber of the wing. This can be achieved whilst the leading and intermediate flap elements 3, 4 are in their fully retracted, stowed positions. Rotation of the trailing flap element 5 is controlled by actuator 5b alone. Movement of the trailing flap element 5 is limited since the intermediate flap element 4 against which the trailing flap element 5 is sealed, is in its fully retracted, stowed position. As is well known, the ability to vary the wing camber during cruise can have significant aerodynamic performance benefits.

Figure 6:
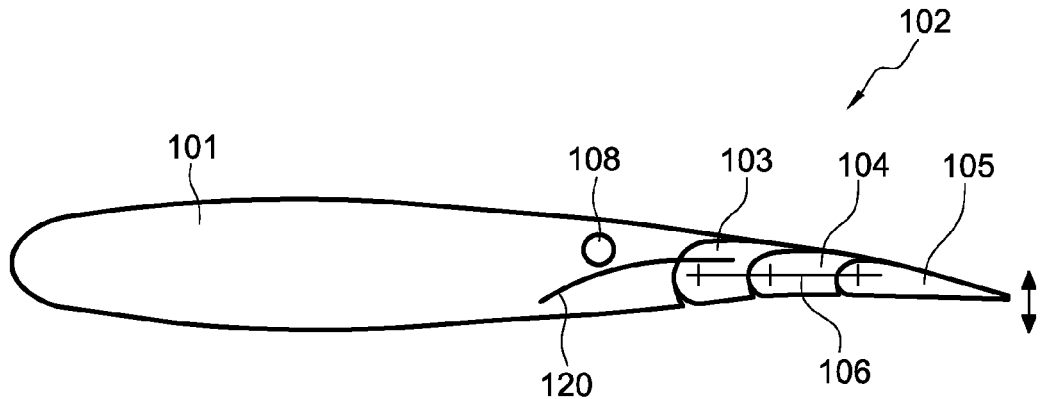
FIG. 6 illustrates a cross section through an alternative embodiment of an aircraft wing having a trailing edge flap arrangement shown in its retracted configuration.

FIG. 6 illustrates an alternative embodiment of the present invention. The wing shown in FIG. 6 has many features in common with the embodiment described with reference to FIGS. 1 to 5 and similar components are denoted by similar reference numerals but numbered in the 100 series. The only difference between the embodiment of FIG. 6 and the embodiment of FIGS. 1 to 5 is that the drop hinge mechanism 7 is omitted and the array of flap elements 103, 104, 105 is supported by a kinematic track mechanism 120 for movement relative to the fixed wing portion 101. Collective movement of the array of flap elements 103, 104, 105 between the retracted and extended positions is effected by rotary actuator 108. The kinematic flap track mechanism 120 is conventional and so will not be described in detail here.

The flap elements 103, 104, 105 are moveable under control of respective linear actuators in an identical manner to the embodiment described with reference to FIGS. 1 to 5. Whilst FIG. 6 depicts the flap arrangement 102 in its retracted position it will be appreciated by those skilled in the art that the extended positions for the flap elements 103, 104 and 105 are substantially identical to those positions of the corresponding components of the flap arrangement depicted in FIGS. 1 to 5.

Although the invention has been described above with reference to one or more preferred embodiments, it will be appreciated that various changes or modifications may be made without departing from the scope of the invention as defined in the appended claims.

The invention claimed is:

1. A trailing edge flap arrangement for an aircraft wing, comprising an array of flap elements supported by a fixed-length, rigid common strut, and a linkage arrangement or kinematic track supporting the common strut from the aircraft wing, the common strut and the array of flap elements supported thereby being moveable collectively between a retracted and an extended position relative to the aircraft wing, wherein at least the leading flap element is rotatable about a pivot axis with respect to and supported by the fixed-length, rigid common strut independently of the movement of the collective array of flap elements.

2. A flap arrangement according to claim 1, wherein the array of flap elements is moveable collectively with the elements sealed together.

3. A flap arrangement according to claim 1, wherein a slot is opened up between the wing and the leading flap element when the array is in the extended position.

4. A flap arrangement according to claim 1, wherein the linkage arrangement includes a drop link.

5. A flap arrangement according to claim 1, further comprising an actuator for moving collectively the array of flap elements relative to the wing.

6. A flap arrangement according to claim 1, wherein each rotatable flap element is rotatable about its axis from a first position, in which the element is sealed to its adjacent element, to a second position, in which a slot is opened up between the element and its adjacent element.

7. A flap arrangement according to claim 1, wherein each rotatable flap element is coupled to a respective actuator for rotating the flap element about its axis.

8. A flap arrangement according to claim 7, wherein the actuator is a linear actuator.

9. A flap arrangement according to claim 1, wherein the flap elements are rotatable about their axes so as to open up a slot between each adjacent pair of elements.

10. A flap arrangement according to claim 1, wherein the trailing flap element in the array is rotatable about its axis, and the element is rotatable to a limited extent whilst the array is in the retracted position so as to vary the camber of the wing.

11. A method of operating a trailing edge flap arrangement on an aircraft wing, the flap arrangement including an array of flap elements supported by a fixed-length, rigid common strut, and a linkage arrangement or kinematic track supporting the common strut from the aircraft wing, the method comprising:
   collectively moving the array of flap elements between a retracted and an extended position; and
   rotating at least the leading flap element about a pivot axis with respect to and supported by the fixed-length, rigid common strut independently of the movement of the collective array of flap elements.

12. A method according to claim 11, further comprising:
   adjusting the flap arrangement to a first configuration in which the array of flap elements are sealed together and in a retracted position;
   adjusting the flap arrangement to a second configuration in which the array of flap elements are sealed together and in an extended position so as to open up a slot between the wing and the leading flap element; and
   adjusting the flap arrangement to a third configuration in which the array of flap elements are in an extended position so as to open up a slot between the wing and the leading flap element, and at least the leading flap element is rotated about its axis so as to open up a slot between the leading flap element and its adjacent element.

13. A method according to claim 12, further comprising rotating the flap elements about their axes so as to open up a slot between each adjacent pair of elements when the flap arrangement is in the third configuration.

14. A method according to claim 13, wherein the angle of incidence of the flap elements increases from the leading to the trailing element in the array.

15. A method according to claim 12, wherein the array of flap elements is partially extended when the flap arrangement is in the second configuration, and is fully extended when the flap arrangement is in the third configuration.

* * * * *